United States Patent
Pelletier et al.

(10) Patent No.: US 9,621,358 B2
(45) Date of Patent: Apr. 11, 2017

(54) METHOD OF CONDUCTING SAFETY-CRITICAL COMMUNICATIONS

(75) Inventors: James Pelletier, Hudson, NH (US); Muhidin A. Lelic, Londonderry, NH (US)

(73) Assignee: UTC Fire & Security Corporation, Farmington, CT (US)

(*) Notice: Subject to any disclaimer, the term of this patent is extended or adjusted under 35 U.S.C. 154(b) by 658 days.

(21) Appl. No.: 13/577,457

(22) PCT Filed: Mar. 18, 2010

(86) PCT No.: PCT/US2010/027787
§ 371 (c)(1),
(2), (4) Date: Aug. 7, 2012

(87) PCT Pub. No.: WO2011/115622
PCT Pub. Date: Sep. 22, 2011

(65) Prior Publication Data
US 2012/0311413 A1    Dec. 6, 2012

(51) Int. Cl.
*H04L 9/00* (2006.01)
*H04L 9/32* (2006.01)
(Continued)

(52) U.S. Cl.
CPC .......... *H04L 9/3271* (2013.01); *H04L 9/0869* (2013.01); *H04L 1/0061* (2013.01); *H04L 2209/34* (2013.01)

(58) Field of Classification Search
CPC ... H04L 9/3271; H04L 9/0869; H04L 1/0061; H04L 2209/34
See application file for complete search history.

(56) References Cited

U.S. PATENT DOCUMENTS 7,003,574 B1    2/2006  Bahl
2003/0233573 A1  12/2003  Phinney
(Continued)

FOREIGN PATENT DOCUMENTS

KR    1020090117576    11/2009

OTHER PUBLICATIONS

Jon Postel, "Transmission Control Protocol", IETF RFC 793, Sep. 1981.*
(Continued)

*Primary Examiner* — Albert Decady
*Assistant Examiner* — Kyle Vallecillo
(74) *Attorney, Agent, or Firm* — Carlson, Gaskey & Olds

(57) ABSTRACT

An exemplary method of communicating with a safety device includes obtaining a key from the safety device that is useable for only a single communication session with the safety device. A plurality of messages are sent to the safety device during the single communication session. Each of the plurality of messages includes the obtained key, an identifier of the source of the message, an identifier of the safety device, a sequence number indicating how many of the plurality of messages preceded the message during the communication session, a command for the safety device, and at least one cyclic redundancy code (CRC) based on content of the message. A next one of the plurality of messages is sent only after confirming that the safety device has accepted a most recently sent one of the plurality of messages.

25 Claims, 5 Drawing Sheets

(51) Int. Cl.
*H04L 9/08* (2006.01)
*H04L 1/00* (2006.01)

(56) References Cited

U.S. PATENT DOCUMENTS

| | | |
|---|---|---|
| 2005/0005093 A1 | 1/2005 | Bartels et al. |
| 2005/0027979 A1 | 2/2005 | Peck et al. |
| 2007/0097934 A1* | 5/2007 | Walker et al. ............ 370/338 |

OTHER PUBLICATIONS

"MODBUS Messaging on TCP/IP: Implementation Guide", modbus.org, May 8, 2002.*
Transmission Control Protocol, DARPA Internet Program, Protocol Specification, RFC: 793, Jon Postel, Sep. 1981.
International Search Report and Written Opinion of the International Searching Authority for International application No. PCT/US2010/027787 dated Nov. 26, 2010.
International Preliminary Report on Patentability for International application No. PCT/US2010/027787 dated Sep. 27, 2012.
Extended European Search Report for Application No. EP 10 84 8104 dated Oct. 15, 2015.
Igor Nai Fovino et al: "Design and Implemetation of a Secure Modbus Protocol," In: "IFIP Advances in Information and Communication Technology," Jan. 1, 2009, XP055218625, ISSN: 1868-4238, vol. 311, pp. 83-96, DOI: 10.1007/978-3-642-04798-5_6, *p. 86-p. 94*.
Modbus, "MODBUS Messaging on TCP/IP Implementation Guide V1.0B," pp. 1-46, Oct. 24, 2006, http://www.modbus.org/docs/Modbus_Messaging_Implementation_Guide_V1_0b.pdf.

* cited by examiner

Fig-4
Fig-5
Fig-6

| 04 | 10 | 03 | 20 | 00 | 0A | YYY | XX |
|----|----|----|----|----|----|-----|----|

*Fig-7* ← 92

| 04 | 10 | 03 | 20 | 00 | 0A | 12 | 34 | 56 | 78 | ?? | ?? | 00 | 02 | 00 | 03 | EC | 12 | 00 | 17 |
|----|----|----|----|----|----|----|----|----|----|----|----|----|----|----|----|----|----|----|----|

← 94

| 00 | 01 | 00 | 19 | YY | WW | ZZ | QQ |
|----|----|----|----|----|----|----|----|

*Fig-8*

| 04 | 10 | 03 | 20 | 00 | 0A | YYY | XX |
|----|----|----|----|----|----|-----|----|

*Fig-9* ← 96

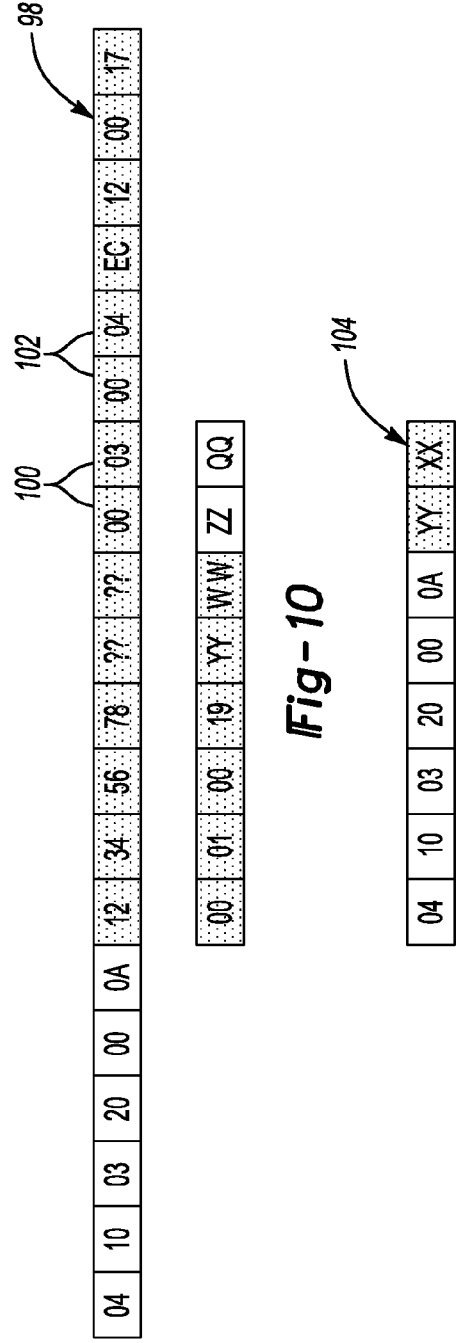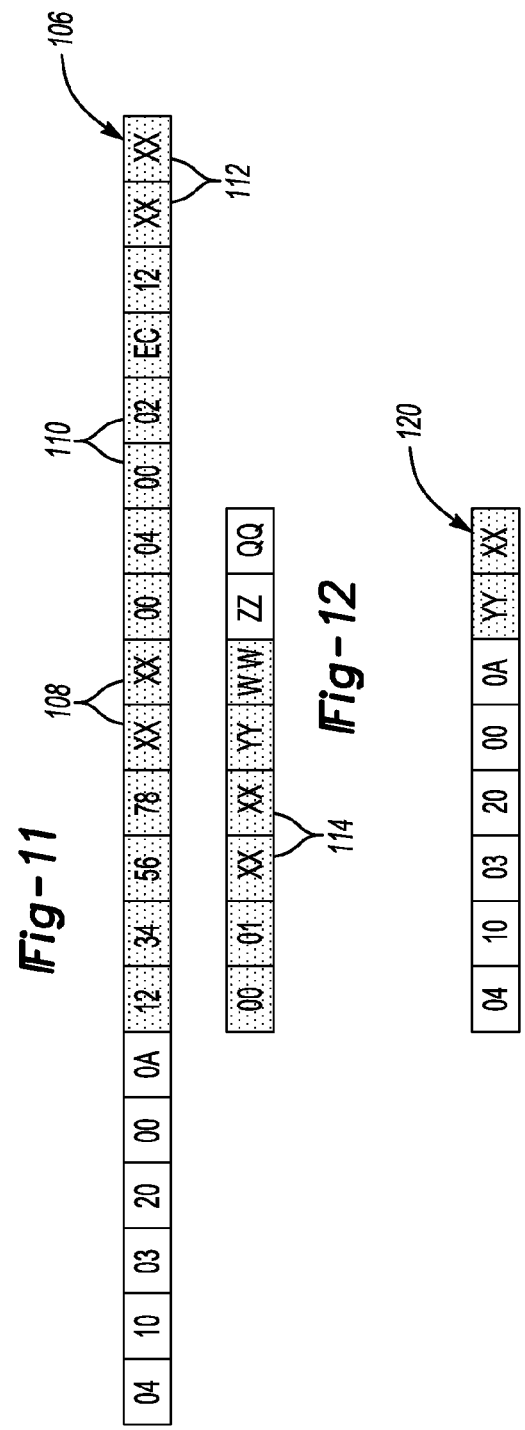

METHOD OF CONDUCTING SAFETY-CRITICAL COMMUNICATIONS

BACKGROUND

A variety of safety devices are used for various situations. Many such devices have monitoring capabilities and provide information regarding situations that are of interest or concern from a safety or security perspective. One such device is a flame detector that detects optical output of a burner flame, for example.

One benefit of having such devices is that they can be deployed in various locations and communicate with a centrally located monitoring station where the information from various safety devices is processed for monitoring purposes or to dispatch a response team or individual depending on the circumstances. There are known protocols for communicating such information. There are two modes of such communications. The first is for the monitoring mode and involves what are considered "Non-Critical Exchanges." The messages exchanged in this first mode are available at run time and do not affect the safety-related operation of the safety device.

The non-critical exchanges typically are based on the instrumentation and control industry standard application protocol entitled Modbus RTU. This protocol is employed for all non-safety critical communications such as requests for monitored condition information, safety device status, and current safety device settings. One aspect of such communications is that they can not alter or affect any configuration parameters of the safety device (i.e., they do not alter the behavior of the safety device's critical function).

The second mode of communication involves what are considered safety-critical communications. For example, there are specific safety-critical parameters that can be set during commissioning or changed while a device is in service. Any communications for setting such a parameter require a communication protocol that is more robust and reliable than that used for the non-critical communications. For example, the Modbus RTU protocol is currently not acceptable for critical communications. Safety-critical communications have to satisfy industry standards such as those contained in IEC 61508-2 Section 7.4.8, EN50159-1, EN50159-2 and EN50129. These standard requirements provide for required probabilities of undetected failure of the communication process that take into account transmission errors, repetition, deletion, insertion, re-sequencing, corruption, delay and masquerade. The industry standards detail specific threats that open and closed communications systems should guard against to avoid potential malfunctions of the safety device resulting from an error or fault in the safety-critical communications.

SUMMARY

An exemplary method of communicating with a safety device includes obtaining a key from the safety device that is useable for only a single communication session with the safety device. A plurality of messages are sent to the safety device during the single communication session. Each of the plurality of messages includes the obtained key, an identifier of the source of the message, an identifier of the safety device, a sequence number indicating how many of the plurality of messages preceded the message during the communication session, a command for the safety device, and at least one cyclic redundancy code (CRC) based on content of the message. A next one of the plurality of messages is sent only after confirming that the safety device has accepted a most recently sent one of the plurality of messages.

An exemplary method of controlling parameter or value setting by a safety device includes generating a key that is useable for only a single communication session with the safety device. A plurality of messages are received during the single communication session. Each of the messages is accepted, respectively, only after determining that the received message includes the generated key, an expected identifier of the source of the message, an correct identifier of the safety device, an expected sequence number indicating how many of the plurality of messages preceded the message during the communication session, a command for the safety device, and at least one cyclic redundancy code (CRC) based on content of the message that matches a corresponding CRC determined by the safety device based on the content of the message.

An exemplary system includes at least one safety device configured to operate based on at least one value or parameter. Supervisory equipment is located remotely from the at least one safety device. The supervisory equipment is configured to allow a user to configure the at least one parameter or value of the safety device during a communication session in which the safety device generates a key for use only during a single communication session with the supervisory equipment, the supervisory equipment determines the key and sends a plurality of messages to the safety device during the single communication session. Each of the plurality of messages is acceptable by the safety device only if the message includes the key, an identifier of the supervisory equipment, an identifier of the safety device, a sequence number indicating how many of the plurality of messages preceded the message during the communication session, a command for the safety device, and at least one cyclic redundancy code (CRC) based on content of the message. The safety device provides an indication of an accepted one of the messages to the supervisory equipment. The supervisory equipment sends a next one of the plurality of messages only after confirming that the safety device has accepted a most recently sent one of the plurality of messages.

The various features and advantages of the disclosed example will become apparent to those skilled in the art from the following detailed description. The drawings that accompany the detailed description can be briefly described as follows.

BRIEF DESCRIPTION OF THE DRAWINGS

FIG. 4 schematically illustrates an example message format used during one portion of the example communication approach.

FIG. 5 schematically illustrates an example message format used during another portion of the example communication approach.

FIG. 6 schematically illustrates an example message format used during another portion of the example communication approach.

FIG. 7 schematically illustrates an example message format used during another portion of the example communication approach.

FIG. 8 schematically illustrates an example message format used during another portion of the example communication approach.

FIG. 9 schematically illustrates an example message format used during another portion of the example communication approach.

FIG. 10 schematically illustrates an example message format used during another portion of the example communication approach.

FIG. 11 schematically illustrates an example message format used during another portion of the example communication approach.

FIG. 12 schematically illustrates an example message format used during another portion of the example communication approach.

FIG. 13 schematically illustrates an example message format used during another portion of the example communication approach.

DETAILED DESCRIPTION

Figure 1:
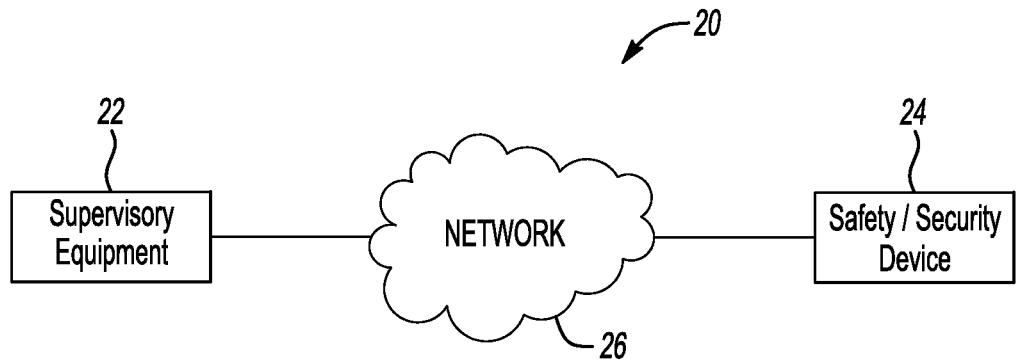
FIG. 1 schematically illustrates a system for communicating between a safety device and supervisory equipment.

FIG. 1 schematically illustrates selected portions of a system 20 that is useful for conducting communications between supervisory equipment (SE) 22 and at least one safety or security device (SD) 24. In this example, the SE 22 may be located at a central monitoring or operations facility where authorized personnel monitor and analyze information provided by a plurality of SDs 24 that are deployed in various remote locations. One example SE 22 comprises a computer. The SD 24 may be any of a variety of safety or security devices. One example SD 24 is a flame detector.

The SE 22 in this example communicates with any selected SD 24 over a network 26 that comprises known communication equipment. The network 26 in one example is line-based and includes hard-wired communication links to facilitate the communications between the SD 24 and the SE 22. In another example, the network 26 includes wireless communication links that facilitate the communications between the SE 22 and the SD 24. One example includes line-based and wireless communication links.

Figure 2:
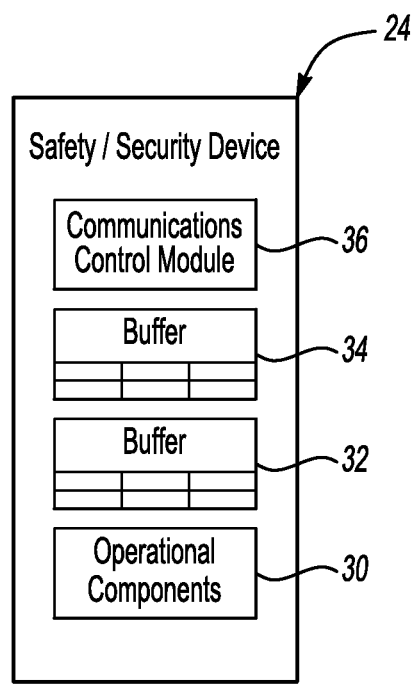
FIG. 2 schematically illustrates selected features of one example safety device.

One example SD 24 is schematically illustrated in FIG. 2. This SD 24 includes operational components 30 that perform the monitoring or sensing of the device. For example, the operational components 30 in one example flame detector include those that detect the optical output of a flame. The operational components 30 for most SDs are already known.

The example SD 24 of FIG. 2 also includes first and second buffers 32 and 34 that each include a plurality of registers. The buffers 32 and 34 in one example reside inside the SD's Modbus map. The buffer 32 in this example is considered a command buffer that is WRITE-only from the SE's perspective. The buffer 34 in this example is called a status buffer, which is READ-only from the perspective of the SE 22. Commands from the SE 22 can be written to the registers in the buffer 32 and status or information can be read from the buffer 34 as the SE 22 communicates with the SD 24. The SD 24 includes a communications control module 36 that facilitates communications over the network 26. The communications control module 36 in one example includes a transceiver and is configured to communicate using a Modbus protocol.

In this example, the communications between the SE 22 and the SD 24 include safety-critical communications that can cause one or more parameters of the SD 24 to be set or changed, for example. Such safety-critical communications in this example satisfy the various criteria of the industry standards for safety-critical communications. In the following example, the Modbus RTU protocol is used as a basis for such communications. For example, standard Modbus codes (e.g., 0x10 Write Multiple Registers and 0x03 Read Multiple Registers) will be used. An enhanced communication strategy is implemented in this example to ensure that the industry standard requirements for safety-critical communications are satisfied even though Modbus communications as previously known could not satisfy those requirements.

Figure 3:
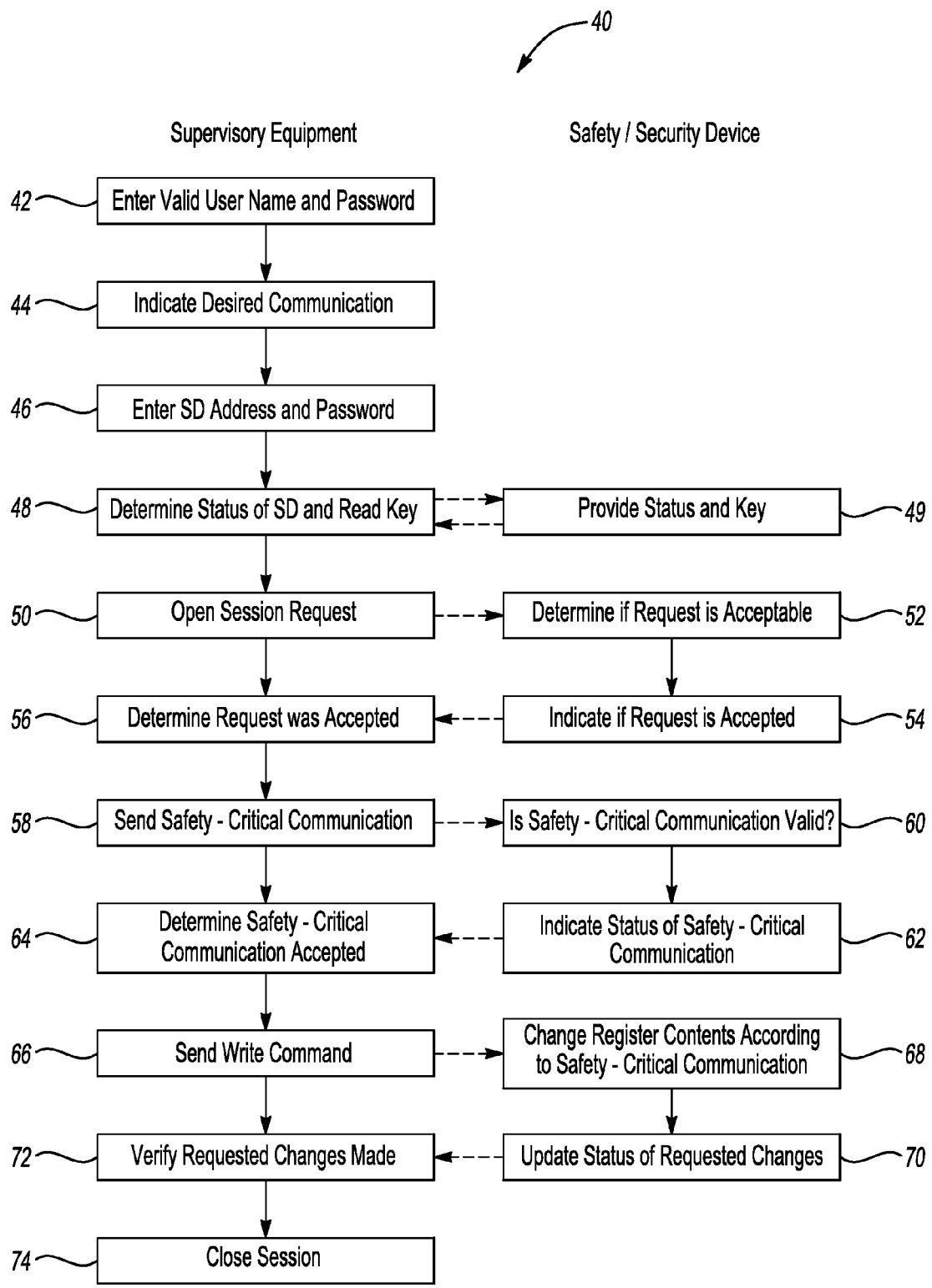
FIG. 3 is a flow-chart style diagram summarizing one example communication approach that facilitates safety-critical communications with a safety device.

FIG. 3 summarizes a communication session 40 that involves safety-critical communications between the SE 22 and the SD 24. Actions taken by the SE 22 are shown on the left side of the drawing and actions taken by the SD 24 are shown on the right side. Communications or exchanges between the devices over the network 26 are schematically shown by the broken lines between the right and left sides of the drawing.

The example communication session 40 begins at 42 where an authorized user of the SE 22 (e.g., a computer at a central monitoring facility) enters a user name and password. Only users that successfully enter a correct user name and password are allowed to participate in a safety-critical communication with the SD 24 through the SE 22.

As indicated at 44, once the user name and password are validated, the user is allowed to indicate or enter the desired safety-critical communication such as indicating a desired change to at least one of the parameters of the SD 24. At 46, once the user enters the desired information, the user is prompted to enter an address and a password of the SD 24 for which the desired changes are intended. One example includes requiring the user to enter a Modbus address of the selected SD 24.

At 48, the SE 22 reads the status buffer 34 of the SD 24 to determine if the status of the SD 24 is appropriate for a communication session to begin. In one example, the status of the SD 24 must be a "communications closed" status, which corresponds to the SD 24 not currently having any open or ongoing communication sessions. The SE 22 also reads or obtains a key from the SD 24 at this point. In one example, the key is based on a random number generated by the SD 24 and each key is used for only one communication session between the SD 24 and another device (such as an SE 22). In one example, the key is the random number. This information is provided by the SD 24 at 49. Once the appropriate status is confirmed and the key is obtained by the SE 22, the user of the SE 22 can initiate the communication session.

At 50 an open session request command is sent to the SD 24. At 52, the SD 24 determines if the open session request is acceptable. This depends on whether the correct key is included and the status of the SD 24 is appropriate to begin a new communication session. The password of the SD 24 is also included in one example open session request and that is verified by the SD 24 at 52. One example open session request includes an indication of a maximum duration of the communication session, which is referred to as a channel "keep alive" time in one example. If the SD 24 is ready for, and capable of an open communications channel, and all the parameters in the open session request message are acceptable to the SD 24, then the SD 24 will indicate success by appropriately setting a status register in the buffer 34 as indicated at 54. In one example, the status register is set to indicate that the open session request is accepted.

At 56, the SE 22 determines if the open session request was successful. If so, the process continues at 58. If the open session request was not successful, the SE 22 will go back to the step shown at 50 and issue a new open session request. Assuming that the request was successfully accepted at the SD 24, the SE 22 provides the safety-critical communication to the SD 24 at 58. In one example, this includes a command to set (e.g., configure or change) an operational parameter of the SD 24. This information is considered a request for change by the SD 24.

At this point, the communication channel or link is open and the SD 24 will only pay attention to messages originating from the SE 22 that opened this session (as indicated by the key and source ID provided with each send from the SE 22). One example includes ensuring that the correct SD 24 receives the correct command by having the SE 22 provide, as part of each message, the Modbus address of the SD 24, the number of Modbus registers being changed by the command, and the umber of the registers of requested parameter or data changes.

The SD 24 in this example performs a "boundary check" on all requested changes at 60. If the SD 24 is willing to allow the specified change(s), the SD 24 will indicate this by setting a status register accordingly at 62. In one example, the status is set to indicate that the parameter ID(s) and value(s) are acceptable.

The SE 22 determines at 64 whether the status information indicates that the write request was acceptable to the SD 24. After making a positive determination at 64 the SE 22 sends a command to write in the new values in the buffer 32 as indicated at 66. At 68, the SD 24 responds by changing the previously provided Modbus register address (or addresses) to the data value(s) previously provided in the safety-critical communication sent at 58. At 70 the SD 24 sets a status buffer to indicate whether the requested change was made.

The SE 22 determines that the status buffer 34 has an indication that the parameter change was successful at 72. Additional changes may be made by repeating the portions of the example procedure shown at 58-72 if the duration of the session has not expired. If the preset maximum duration has expired no additional changes can be made using the key provided by the SD 24 and an all new session will have to be initiated as described above. If all desired changes are complete and the maximum duration for the session has not expired, the SE 22 can issue a close session command as shown at 74.

The communication process summarized in FIG. 3 allows for using the Modbus protocol that the SDs 24 are already configured to recognize with additional security added to satisfy the industry standard requirements for safety-critical communications. The Modbus protocol involves registers having particular addresses. One example implementation includes Modbus registers in the buffer 34 as indicated in Table 1 below. In this example, there are eleven registers and a total of twenty-two bytes.

TABLE 1

| Modbus Register Address | Description |
|---|---|
| 40601/40602 | Source ID |
| 40603 | Keep Alive Time |
| 40604 | Message Sequence Number: |
| 40605 | Session KEY |
| 40606 | Session Status |
| 40607 | Modbus Register Address |
| 40608 | n Number of Modbus Data Registers |
| 40609 | n Number of data elements |
| 40610 + (n − 1) | Last Operation Status |
| 40611 + (n − 1) | 16-bit Modbus Style CRC of the above registers 40601 through 40610 + (n − 1) |

Buffer 34 in this example includes register numbers 40601 and 40602 that are used to store the source ID of the SE 22 involved in a communication session. This information is provided by the SE 22 and stored by the SD 24. The register number 40603 stores the remaining time for the communication session. The keep-alive time value begins with the maximum duration requested by the SE 22. In one example, the duration time is counted down in 250 millisecond increments. The value in the 40603 register is decremented during the communication session so that it provides a current remaining time for that session. The register number 40604 contains a message sequence number that is the sequence number of the last successfully processed message by the SD 24. The SE 22 can use the information in this register to check on correct message sequencing and to detect dropped messages, for example. The SD 24 can also detect when a message from the SE 22 is out of an expected sequence.

The example buffer 34 also includes a register number 40605 that stores a session key. The SE 22 must read and then use a single key in order to open a safety-critical communication session with the SD 24. The same key is required in all SE 22 messages for that communication session. The most recently read key value is the one required to open a session.

The register 40606 contains session status information. Several possible values are used in one example as follows: 0=Undefined; 1=COMMUNICATIONS SESSION CURRENTLY CLOSED; 2=OPEN SESSION REQUEST ACCEPTED; 3=PARAMETER ID(s) & VALUE(s) ACCEPTABLE; or 4=PARAMETER CHANGE SUCCESSFUL.

The contents of register 40607 indicate the first register that is to be changed responsive to a change command from the SE 22. The register 40608 indicates the number of registers that are to be changed. In one example, the number is always one because only one register can be changed per write request. In another example, as many as one hundred registers may be changed with a single write request. The register 40609 indicates the number register data values that user of the SE 22 wishes to change.

The register 40610+(n−1) provides an indication of the status of the last operation. Example status indicators include: 0=success, 1=invalid sequence number, 2=invalid CRC, 3=invalid parameter address, 4=invalid parameter value, 5=invalid command, 6=invalid key, 7=invalid keep-alive time request, 8=keep-alive time expired, 9=protocol error and 10=invalid source ID. The register 40611+(n−1) contains a 16-bit Modbus style cyclic redundancy code (CRC) of the above registers 40601 through 40610+(n−1). The CRC is determined by the SD 24 using a known CRC function based on the contents of the registers in the buffer 34.

Table 2 below describes an example of the buffer 32.

TABLE 2

| Modbus Register Address | Description |
| --- | --- |
| 40801 & 40802 | Source ID |
| 40803 | Keep Alive Time, in 250 mS increments, |
| 40804 | Command Message Sequence Number |
| 40805 | Command Code |
| 40806 | Session KEY |
| 40807 | Modbus Register Address or Password |
| 40808 | n Number of Modbus Data Registers |
| 40809 | n Number of data elements |
| 40810 + (n − 1) | CRC of the above registers 40801 through 40809 + (n − 1) a.k.a. Payload CRC |

The registers having the addresses 40801 and 40802 contain an unsigned, thirty-two bit source ID value provided by the SE 22. This ID must remain constant throughout a communication session. If the SD 24 sees a different ID than that which was used to open the session, the SD 24 discards the entire message having such an invalid ID. The 40803 register indicates the time the session will remain alive or active. One example uses 250 millisecond increments and allows a range from 1 (250 milliseconds) to 100 (25 seconds).

The register addressed 40804 contains the sequence number value of the current command message. In one example, the open session request message must have the value 0x01 in this register. All subsequent sequence numbers must be one more than the previous one. The 40805 register contains a value corresponding to a command code. Example command codes include: 0=not used, 1=request to open a communications session, 2=request to close a communications session, 3=request to execute a write command to write at least one parameter, value or both and 4=request to execute the write command.

The register 40806 contains the session key that the SE 22 uses for a communication session with the SD 24. The session key is generated by the SD 24, provided to the SE 22 and then used by the SE 22 for all messages, requests or commands that are part of the same communication session. The 40807 register contains the starting address that the SE 22 wants to modify or the password of the SD 24. The password can only be known by the user of the SE 22 if it is provided outside of the communication session of this example.

The register having the address 40808 contains the number of registers that follow this register, which is also the number of registers that the SE 22 will change. The 40809 register contains the number of data elements that the SE 22 will change. The 40810+(n−1) register contains a CRC value of the other registers shown in Table 2 (i.e., a payload CRC). The CRC in the buffer 34 is determined by the SD 24 and the CRC of the register 40810+(n−1) is determined and provided by the SE 22. If the CRC from the SE 22 does not match that determined by the SD 24, then an error is detected and the associated communication is ignored by the SD 24.

The process summarized in FIG. 3 involves various checks that ensure that the safety-critical communications satisfy the industry standard requirements on such communications. One particular communication session is explained below as an example for discussion purposes to demonstrate how such checks ensure the integrity and reliability of the safety-critical communications between the SE 22 and the SD 24.

The example process and checks allow for using the Modbus protocol as a platform for the example safety-critical communication session. Other protocols may be used in some examples. Appropriate format or data changes specific to such a protocol can be made depending on the particular protocol chosen for a safety-critical communication session. The features of the disclosed example render a safety-critical communication compliant with the industry standards for such communications using the Modbus protocol and those skilled in the art who have the benefit of this description will realize how those features may be adapted to other protocols.

In this example, assume that the SE 22 has a source ID=0x1234, the SD 24 has a Modbus address=0x07, the Modbus register to change is identified as 0x0017 (which translates to 40,001+23=40,024 or decimal 23) and the desired new value for the parameter to change=0x0019 (decimal 25). In this example, the register to be changed will accept values in the range of 1-31.

The communication session begins at the step 42 in FIG. 3, where the user of the SE 22 enters a user name and password, which are required if the user intends to conduct a safety-critical communication. In this example, the user intends to change at least one parameter of at least one SD 24 which will configure or reconfigure the SD 24 in some aspect. The user enters information corresponding to the desired change as indicated at 44 and 46. In one example, once this information is entered, the SE 22 will indicate to the user that changes are pending or are in progress and disallow any other user interactions until the changes are completed.

At 48, the SE 22 determines the status of the SD 24 to make sure that it is properly situated to accept a change request. In this example the register 40603 keep alive time value should read 0x0000, which means that the keep alive count down timer has expired. This indicates that the remaining duration of an ongoing communication is zero so that the SD 24 is not currently in a communication session with the SE 22 or another SE. Another required status criterion in this example is that the register 40606, which gives session status, should read 0x0001. This means that the communications channel is closed and available to be opened.

The SE 22 determines what the key value is in the register 40605. The session key in this example is a 16 bit unsigned integer key randomly generated by the SD 24 each time a read operation is performed on this register and the session status of the register 40606 is 0x0001 (e.g., the session is closed and available to be opened). In order for the SE 22 to open a secure communications channel, the SE 22 must read this key and then provide it via register 40806 in a properly configured open communications request message (e.g., step 50 in FIG. 3). In the very unlikely event that there are two (or more) SEs connected in the system, the last one to read this key will have the valid key that will work in the next open communication request message received by the SD 24.

An example Modbus message requesting the status and key of the SD 24 is shown at 80 in FIG. 4. All values in the example message are in hexadecimal format. Each of the partitions schematically shown in FIG. 4 (i.e., rectangles) corresponds to a byte. The first byte 0x04 is the Modbus address of the SD 24. The next byte 0x03 is the "Read Holding Registers Function." The bytes 0x0258 translate to register address 40601 (e.g., 0x0258=600 then 600+40001=40601). The byte 0x0B identifies eleven registers to be read, which in this example corresponds to the entire status buffer 34. The last two bytes XXYY contain the Modbus 16 bit CRC value of the preceding bytes in Low byte, High byte order. For example, if the CRC=0x1234 then XX=0x34.

The SD 24 responds to this message at 49 in FIG. 3 and makes several determinations. The first check is whether the SE 22 used the wrong SD address. If so, the SD 24 will not respond. The message is erroneous or intended for another device if the SD address of the SD 24 does not match that in the message 80.

The SD 24 determines if the message includes function codes other than 0x03, 0x10, or 0x06. If so, the SD 24 issues an exception response 0x01 (e.g., an ILLEGAL FUNCTION CODE) assuming that the Modbus address and the CRC appear valid. In one example, whenever the SE 22 issues a command or function code for a register address that is not compatible with the acceptable codes or messages for that address, the SD 24 issues an exception response indicating the error. Example exception responses indicate at least one of an illegal function, an illegal address or illegal data.

Another check made by the SD 24 is whether the CRC (XXYY) received from the SE 22 matches the CRC generated by the SD 24 based on the received data. It is possible, for example, for some of the data to have been corrupted during transmission between the SE 22 and the SD 24. The CRC generated by the SE 22 would be based upon the original data while the CRC determined by the SD 24 would be based upon at least partially corrupted data. Therefore, the two CRC values would not match. If the CRC values do not match, the SD 24 disregards the entire message from the SE 22. The message will eventually time out and the SE 22 will realize that it has not been accepted. Additionally, the SE 22 will not receive the key from the SD 24 and, therefore, will have no success attempting to open the safety-critical communication session.

In the event that the SD 24 makes a positive determination for each of the checks on the request for status and the key, the SD 24 will respond with a message as schematically shown at 80 in FIG. 5. The first byte 0x04 identifies the Modbus address of the SD 24. The second byte 0x03 is the read holding register function. The byte 0x16 indicates that 22 bytes or 11 registers were read. The bytes shown from 84 through 86 contain the data in the registers 40601 through 40610 in a high byte, low byte order. The bytes labeled XX and WW in this example correspond to the register 40611. These bytes contain the CRC of the registers 40601 through 40610. In this example, the CRC WWXX is a CRC within a CRC that allows the SE 22 to validate the contents of these registers. The last two bytes shown in FIG. 5 0xYYZZ is the Modbus message CRC generated from all the previous message bytes. The information is presented in low byte, high byte order such that if the CRC equals 0x1234, for example, then YY equals 0x34.

Assuming that the SE 22 has successfully received the key from the SD 24 and the session status of the SD 24 is appropriate (e.g., closed), the SE 22 can then issue an open communications session request as shown at 50 in FIG. 3. When the SD 24 receives this request, it determines whether the value of the key provided from the SE 22 matches the last randomly generated key transmitted from the register 40605 of the SD 24. In one example, the SD 24 determines whether the sequence number is correct, it will record the source ID of the SE 22, checks both CRC values and determines that the SD password provided by the SE 22 matches the password of the SD 24. The SD 24 will then set the maximum duration time (e.g., keep alive time) based upon that requested by the SE 22 to set the maximum duration of the communication session. Additionally, the SD 24 validates that the command code for an open communications request is correct. In one example, the only valid command code acceptable to the SD 24 when its status is "communications closed" is the command code for an open communications request.

FIG. 6 shows one example format of an open communications request message at 90. The first byte 0x04 indicates the Modbus address of the SD 24. The second byte 0x10 describes the write multiple registers function. The next two bytes 0x0320 translates to the register address 40601. In this example, that is the only valid address that is acceptable to the SD 24 for the open communications request. Any other address would elicit an illegal data address exception response from the SD 24. The following two bytes 0x000A indicate that all ten registers of the buffer 32 will be written as a result of completing the safety-critical communication session. In one example, any value other than 10 at this point in the message would elicit an illegal data value exception response from the SD 24.

The next four bytes 0x1234 and 0x5678 correspond to the registers 40801 and 40802. These four bytes identify the source ID of the SE 22. Once the SD 24 opens the communication session responsive to the request, the SD 24 will ignore all communications from any other source ID other than the one provided in this register at the open request time. The SD 24 will continue to do so until the SE 22 closes the channel or the maximum duration time of the communication session expires. The next two bytes 0x0064 corresponds to the register 40803 and indicate the maximum duration time of the session, which in one example can be up to 25 seconds.

The following two bytes 0x0001 correspond to register 40804, which contains the message sequence number. An open session request message in this example must have the value 0x01 in this register. Any value other than one will result in a failure to open the communication session. That can be indicated by the status register 40606 which can be set to a value indicating an invalid sequence number. The following two bytes 0x0001 in this example correspond to the register 40805. The contents of that register in this example indicate that the communications channel has been open.

The following two bytes 0xEC12 correspond to register 40806, which contains the session key that the SE 22 previously obtained from the SD 24. The next two bytes 0x00CD corresponds to the register 40807. This information corresponds to the password of the SD 24. In this example the user of the SE 22 obtains that password from an outside source external to the SD 24.

The following two bytes 0x0001 contain the contents of the register 40808, which indicates the number of data registers. The following two bytes 0x0000 corresponds to register 40809, which in this example is a data value that is not used in the open communication session request command.

The following two bytes 0xWWYY is an unsigned 16 bit CRC value of the registers 40801 through 40808. The last two bytes 0xQQZZ are the normal Modbus CRC for all bytes in the message.

In one example, the SE 22 determines if the open session request was granted by reading all of the status registers 40601 through 40611 by sending a Modbus 0x04 read input registers message to the SD 24.

Before granting the open communication session request, the SD 24 performs a number of tests on the message and makes several determinations regarding the validity or acceptability of that message. In one example, 14 different tests are applied to the open communication session request. In one example, the SD 24 has embedded firmware that is configured to conduct the following tests.

The SD 24 determines whether the SE 22 has used the wrong SD address. If the address of the message does not match the address of the SD 24, the SD 24 will not respond. Either the address is incorrect or the message was intended for another device. The SD 24 also determines whether the function code, which should correspond to writing multiple registers, is correct in the received message. If the function code from the SE 22 is not correct, the SD 24 does not respond or drops or disregards the message.

The SD 24 also determines whether the CRC (QQZZ in FIG. 6) as received by the SD 24 matches the CRC that the SD 24 generates itself from the received data. If the CRCs do not correctly match, the SD 24 will not respond and will drop or disregard the message. In one example, the register 40610 will be populated with an error status indication which corresponds to an invalid CRC value if they do not match.

Another determination made by the SD 24 is whether the CRC (WWYY in FIG. 6) matches the CRC that the SD 24 generates itself from the received data. In the event that the CRCs do not match, the SD 24 will drop or disregard the message. Again, the register 40610 may be populated with an indication of an invalid CRC.

Assuming that the four determinations mentioned above all provide a positive result, the SD 24 determines whether the SE 22 has used an appropriate register address. In this example, the correct address should be 0x0320 which corresponds to register 40601. If the correct register address was used, the SD 24 will continue checking the open request message. If not, an exception response may be issued indicating an illegal data address.

Next, the SD 24 determines whether the SE 22 is attempting to write more or less than the required number of registers. In this example, it is required to write all ten registers in the buffer 32. If more or less than ten registers are indicated in the open sessions request message, an exception response indicating an illegal data value is provided by the SD 24. In one example, the register 40610 is populated with information indicating an error status such as protocol error.

Another determination made by the SD 24 is whether the SE 22 is requesting a maximum duration time for the communication session that is outside of the preset limits. The SD 24 also determines whether the appropriate command code has been set for the register 40805. In this example the command code should be to open the communications. If the communication session is already opened, a command to open it will be considered invalid and the SD 24 will take no action responsive to the message. The SD 24 also determines whether its current communication session status is closed. If not, the SD 24 will not take any action responsive to the open communication request message.

Another test performed by the SD 24 is whether the SE 22 is attempting to set the register 40806 to a value less than one or greater than four and a communication session status is currently closed. The SD 24 also determines whether the SE 22 is setting the register 40805 to the open communications command code and the SD 24 checks whether the sequence number in the register 40804 is one because the open communication sessions message should be the first message of that session. If this test is not passed, the SD 24 will take no action other than responding with a normal Modbus reply. The SD 24 under these circumstances sets the status register 40610 to indicate an invalid sequence number, the register 40606 to indicate that the session is closed and a communication session will not be opened. The SE 22 will be able to read that status information to know that the request to open a communication session has failed.

Another test performed by the SD 24 includes determining whether the SE 22 is attempting to set the register 40805 to a value that does not match the current value of the key provided by the SD 24. If the keys do not match, the register 40610 is set to indicate an invalid key was received. Another check performed by the SD 24 is whether all of the previous tests have been passed, the SE 22 has provided an appropriate command code for the register 40805 and that the register 40807 has been set to a value that matches the password of the SD 24. The next check made by the SD 24 is to determine first that all previous tests have been passed and that the SE 22 has set the register 40808 to a value within an acceptable range (e.g., less than 1 or greater than 100 would be outside the range in one example). This value should correspond to the number of data registers of the SD 24. If the number is outside of the acceptable range, the open session request message will be rejected.

The SE 22 reads all eleven status buffer registers and determines whether the open session request was successful. Assume that the request was proper and accepted by the SD 24. Under these circumstances, the SD 24 will set the register 40606 to indicate that the request has been accepted and will change the register 40604, which contains the message sequence number, to 0x0001. This is the mandated sequence number that the SE 22 provided in the open request message. At this point, the communication channel is confirmed open and the SD 24 will only accept and follow messages originating from the source ID of the SE 22 that opened this session until the session is closed.

Figures 7, 8, 9:
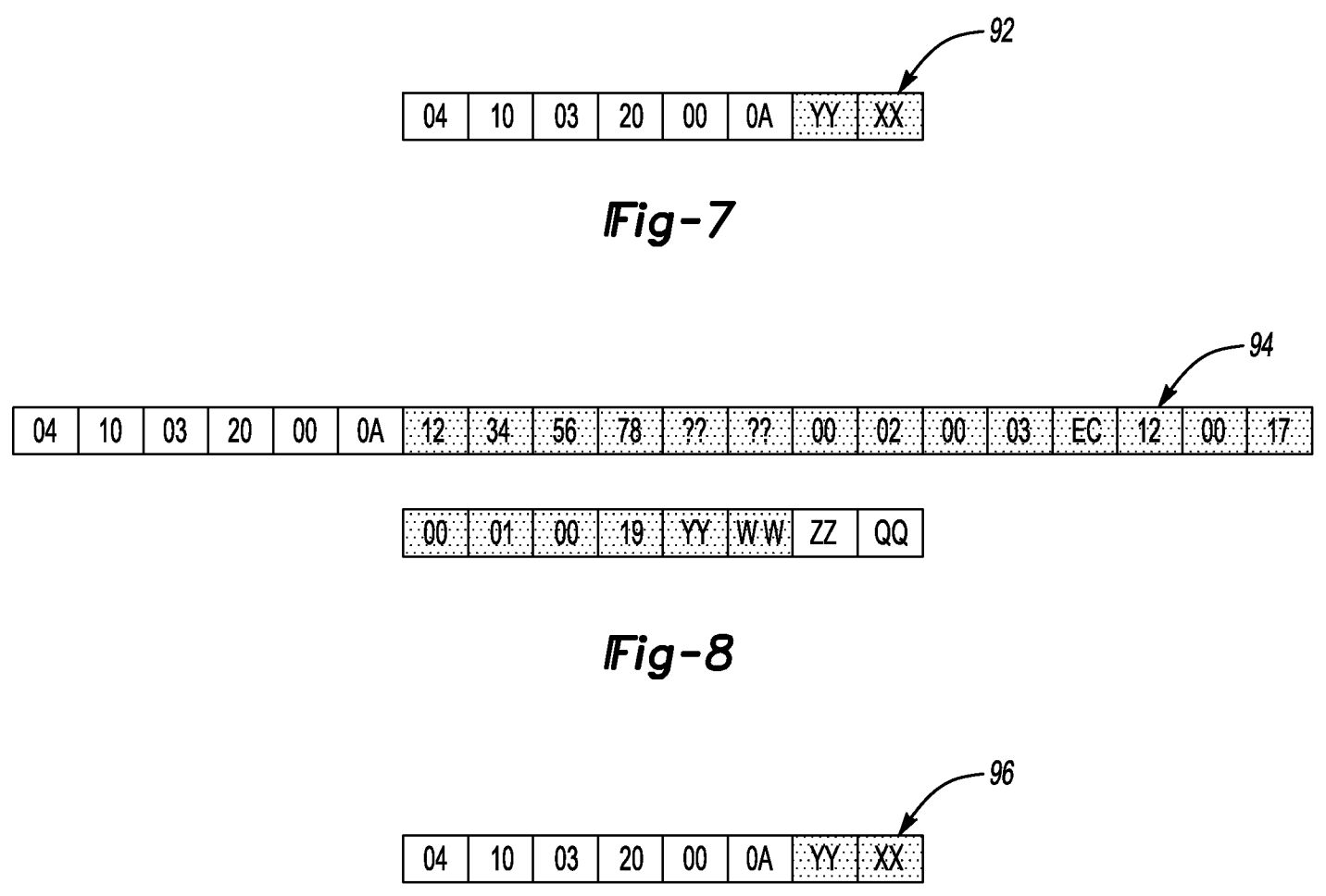

If the open session request was granted, the SD 24 provides a response as schematically shown at 92 in FIG. 7. The first byte indicates the address of the SD 24. The next byte indicates a write multiple registers function. The next two bytes 0x0320 translates to the register address 40801. The following two bytes 0x000a indicates the number of registers to be written. The last two bytes 0xXXYY are the Modbus message CRC generated from all the previous message bytes presented in low byte, high byte order.

The next step in this example is to send the safety-critical communication at 58 in FIG. 3. In this example, the SE 22 sends a message requesting that at least one parameter ID or value be written. As indicated above, the user wants to change the parameter at the Modbus register address 0x0017 to the value 0x0019 and an acceptable range for this parameter is between 1 and 31. The SE 22 creates a single Modbus message in this example that sets all of the command buffer registers with the correct information. In this example, the ten registers 40801-40810 of the buffer 32 are all set at once using the write multiple registers function code sent to the address 40801.

FIG. 8 schematically illustrates an example write parameter request message at 94. Each partition (i.e., rectangle) of the illustrated message corresponds to a byte. The contents of the message 94 include the address of the SD 24 in the first byte. The next byte 0x10 contains the write multiple registers function code. The next two bytes 0x0320 translates to the address 40601, which is the only valid address in this example. Any other address would elicit an illegal data address exception response from the SD 24. The following two bytes 0x000A indicates that all ten registers must be written. The following four bytes 0x12345678 correspond to the registers 40801 and 04802 and contain the ID of the SE 22 in this example. The next two bytes 0x???? correspond to the register 40803, which includes the remaining time of the communication session. This value is of no interest to the SD 24 in a right parameter or right value request message. It is still part of the payload that affects the CRC value. For purposes of this message at this point in this example, this register may contain any value. The next two bytes 0x0002 correspond to register 40804. The value of the message sequence number at this point must be one more than the previously used sequence number. The last sequence number that was used is determined by the SE 22 from the register 40604. The following two bytes 0x0003 correspond to register 40805 and contains the command code for the current request. In this instance, the command code should correspond to the write parameter ID and value request intended by the user of the SE 22.

The next two bytes 0xEC12 correspond to register 40806 and indicate the session key of this message. That session key must match one that was used for opening the session and must be consistent with the session key for all messages during this particular communication session. The next two bytes 0x0017 indicate the starting Modbus address of data registers that should be modified. The next two bytes 0x0001 correspond to register 40808 and contain the number of data registers. The next two bytes 0x0019 correspond to register 40809 and indicate the data value that is intended to be written to the address 0x0017.

The last four bytes contain CRC values. The bytes 0xWWYY contain an unsigned 16 bit CRC value of registers 40801 through 40809. The final two bytes 0xQQZZ contain the normal Modbus CRC for all bytes in the message.

The SD 24 will respond with a message as schematically shown at 96 in FIG. 9. The first byte 0x04 is the Modbus address of the SD 24. The next byte 0x10 indicate the write multiple registers function. The next two bytes 0x0320 indicate the register address 40801. The following two bytes 0x000A indicate the number of registers that are written. The final two bytes 0xXXYY contain the Modbus message CRC generated from all of the previous message bytes presented in low byte, high byte order.

The SD 24 performs several tests on the write request message from the SE 22. If any of the tests fail, the message is not accepted and the SD 24 provides a response to the SE 22 indicating the problem with the message. The SD 24 determines whether the address provided by the SE 22 matches the address of the SD 24. The SD 24 also determines whether the appropriate function code is contained in the message, the CRCs received from the SE 22 match the corresponding CRCs generated by the SD 24 based upon the information in the received message. The SD 24 also determines whether the register address is correct and whether the SE 22 is requesting to write the required number of registers. The SD 24 also determines whether the register 40805 has been set to the correct command code and whether the register 40806 is set to an appropriate command code. The SD 24 also determines whether the session key is the key for this particular communication session. The SD 24 determines whether the correct source ID is included with the message and that the appropriate sequence number is associated with the message.

The SD 24 also determines whether register 40807 is set to a value greater than the last modifiable Modbus register address that would be permitted at that particular time. If all previous determinations provide a positive result, the SD 24 also determines whether the register 40808 is set to an appropriate value. The SD 24 also determines whether the SE 22 is attempting to set one or more data values starting at the register 40808 to a value that is not allowed. Every Modbus address that is being requested to be changed must have the new value provided in the message validated by the SD 24.

If all other tests have passed, the SD 24 finally determines whether the keep-alive time has expired to make sure that there still is time remaining for the duration of the communication session. If any one of those tests is not passed, the message will not be accepted by the SD 24.

As shown at 64 in FIG. 3, the SE 22 will then determine the status of the safety-critical communication. Specifically, the SE 22 determines whether the write request was acceptable to the SD 24. If so, the SE 22 moves onto the step 66 and sends a write command. An example write command message is schematically shown in FIG. 10.

The message represented at 98 contains the same number of bytes as the message 94 shown in FIG. 8. By comparing those two figures, it becomes apparent that most of the bytes contain the same value. Therefore, the description of FIG. 8 above explains the content of many of the bytes in FIG. 10. The two bytes shown at 100 contain the message sequence number in register 40804. That value is increased by one compared to the write request message 94 of FIG. 8 because it is the next message in sequence provided by the SE 22. If that value did not increase by an appropriate amount, the SD 24 would reject the message 98. The two bytes shown at 102 contain the Modbus command code 4 in the register 40805. In this example, the Modbus command code 4 is an execute write command. This is different than the command code 3 contained in corresponding bytes in the message 94 of FIG. 8 because that was a write request command message. Otherwise the bytes shown in FIG. 10 correspond to those discussed above with regard to FIG. 8.

The SD 24 will respond with a message as shown at 104 in FIG. 11. This message includes bytes that correspond to those discussed above with regard to the message 96 in FIG. 9.

Once again the SE 24 performs multiple checks on the message 98 shown in FIG. 10. If any one of the tests regarding that message fails, the message is rejected and the SD 24 will not perform the requested write execute command. Using multiple tests or checks on each message from the SE 22 contributes to providing the level of security needed to conduct safety-critical communications according to recognized requirements.

In this example, the SD 24 determines: (1) whether the correct address of the SD 24 is contained in the message, (2) whether the appropriate function code is included in the message, (3) whether the CRC based on the values of the registers 40801-40809 received from the SE 22 matches the corresponding CRC generated by the SD 24, (4) whether the CRC based upon the data within the message itself provided by the SE 22 matches the corresponding CRC determined by the SD 24, (5) whether an appropriate register address is provided in the message; (6) whether the SE 22 command indicates an appropriate number of registers to be written, (7) whether the command code in register 40805 is correct, (8) whether the register 40806 contains a proper command code, (9) whether the session key is correct, (10) whether the source ID of the SE 22 is correct, (11) whether the sequence number of the message is correct, (12) whether the number of data registers is appropriate set within the message and (13) whether the maximum duration for the communication session has passed.

If every determination made by the SD 24 provides a positive result, the SD 24 will execute the write command and make appropriate changes to the registers indicated within the message.

The SE 22 will then verify the requested changes (as shown at 72 in FIG. 3, for example). If everything appears to have been correct, the SE 22 will then issue a close session command as schematically shown at 106 in FIG. 12. The first ten bytes contain the same information as described above in connection with the previous messages provided by the SE 22 in this example. The next six bytes are different because of the difference between a write request command as shown in FIG. 10 and a close session command as shown in FIG. 12. The bytes shown at 108 indicate the register 40803 contents, which corresponds to the keep alive time. The next two bytes 0x0004 indicate an increment in the message sequence number. The next two bytes shown at 110 contain the command code indicating the desire to close the communication session. The bytes shown at 112 and 114 are ignored by the SD 24 because the parameter change was successful.

Before closing the communication session, the SD 24 will verify the contents of the closed sessions request message 106. In one example, the SD 24 determines (1) that the correct device address is contained in the message, (2) that the appropriate function code is provided, (3) that the CRCs values in the message match the corresponding CRCs values determined by the SD 24, (4) that the appropriate register address is provided in the message, (5) that the message indicates the correct number of registers that were written, (6) that the command code is correct or valid, (7) that the session key is correct, (8) that the source ID is correct, (9) that the message sequence number is appropriate, (10) that the register 40808 has been set correctly and (11) that the keep-alive time is still greater than zero.

If every check made by the SD 24 provides a positive result, the SD 24 provides a successful response message as indicated at 120 in FIG. 13. The first byte of that message indicates the address of the SD 24. The second byte indicates the function that was performed in response to the write command. The next two bytes 0x0320 indicate the register address 40301. The next two bytes 0x000A indicate the number of registers that were written. The last two bytes indicate the Modbus message CRC generated from the previous message bytes.

Once the example SD 24 closes a communication session, the session key for that session is now invalid. For example, the SD 24 generates a new key (as a random number, for example) upon executing a closed session command or upon expiration of the keep-alive time of the communication session.

As mentioned above, there are specific requirements for safety-critical communications that are known in the industry. The disclosed example approach addresses specific issues provided for in industry standards. The threat against repetition is addressed by the inclusion of the message sequence number in the messages from the SE 22 as described above. The threat against deletion is also addressed by including the message sequence number. A threat against deletion is also addressed by utilizing an orderly approach for performing a single parameter or value change as occurred in the example described above.

Another threat that must be addressed is known as insertion. The disclosed example includes the message sequence number, in part, to address this threat. Also requiring that a source ID be included in each message ensures that only the authorized source for a particular communication session is able to provide any write commands to the SD 24.

It is necessary to avoid re-sequencing to satisfy industry standards. The disclosed example includes the message sequence number to prevent re-sequencing. Additionally, the SE 22 checking the status buffer after each write operation provides the SE 22 with information regarding the status of the SD 24 and information regarding each value or parameter that the SE 22 intends to change. This status information is useful for avoiding re-sequencing.

Addressing the threat of corruption occurs in the disclosed example by including and checking the CRC values. The threat of delay is addressed by setting a maximum duration for the communication session.

The threat of masquerade is addressed by several features of the disclosed example. The way in which the SE 22 must open a communication session, including requiring the SE 22 to obtain a key from the SD 24 prevents masquerading. Additionally, the Modbus address (e.g., for register 40802) that was used in the successful open communication session command, must be included with all write commands for that communication session. Additionally, all of the steps described above can be required in order for purposes of changing a single parameter in the SD 24. Each of the tests or checks on the messages from the SE 22 will prevent any one of them from being accepted by the SD 24 unless all of the criteria as described above are satisfied.

The disclosed example allows for utilizing the Modbus RTU protocol as a basis for conducting safety-critical communications with safety devices. It becomes possible to remotely configure or alter a safety device by changing one or more operational values or parameters for such devices. The disclosed example satisfies the industry-required standards for such communications by addressing the threats described above and providing an appropriate probability of safety system failure such that the safety-critical communications are permissible using the disclosed approach.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating with a safety device, comprising the steps of:
   obtaining a key from the safety device that is useable for only a single communication session with the safety device;
   sending a plurality of messages to the safety device during the single communication session, each of the plurality of messages including
   the obtained key,
   an identifier of the source of the message,
   an identifier of the safety device,
   a sequence number indicating how many of the plurality of messages preceded the message during the communication session,
   a command for the safety device, and
   at least one cyclic redundancy code (CRC) based on content of the message; and
   sending a next one of the plurality of messages only after confirming that the safety device has accepted a most recently sent one of the plurality of messages.

2. The method of claim 1, comprising sending the messages using a Modbus protocol.

3. The method of claim 2, wherein the at least one CRC is a Modbus CRC.

4. The method of claim 1, wherein the at least one CRC comprises a first CRC based on data within the message and a second CRC based on registers of the safety device that are affected by at least one of the message commands.

5. The method of claim 1, comprising
determining a status of the safety device; and
attempting to initiate the communication session only when the determined status indicates that the safety device is currently not involved in a communication session.

6. The method of claim 1, wherein the key is generated by the safety device based on a random number and the key in each of the plurality of messages must be the same for each message to be accepted by the safety device.

7. The method of claim 1, comprising
setting a maximum duration time for the communication session when initiating the communication session; and
automatically terminating the communication session responsive to the maximum duration time expiring.

8. The method of claim 1, comprising
formatting each message so that each of the obtained key, the identifier of the source of the message, the identifier of the safety device, the sequence number, the command for the safety device, and the at least one CRC are associated with a respective, preselected register of the safety device.

9. The method of claim 1, wherein the safety device makes a plurality of determinations regarding the obtained key, the identifier of the source of the message, the identifier of the safety device, the sequence number, the command for the safety device, and the at least one CRC of each message and accepts each message only if the all of the plurality of determinations for each message satisfies a predetermined criterion.

10. The method of claim 1, comprising
sending the plurality of messages to the safety device in a specified order comprising
(i) an open communications request message,
(ii) a message indicating a requested change to at least one parameter or value of the safety device, and
(iii) a message directing the safety device to make the requested change; and
confirming that each of the messages is accepted by the safety device.

11. A method of controlling parameter or value setting by a safety device, comprising the steps of:
generating a key that is useable for only a single communication session with the safety device;
receiving a plurality of messages during the single communication session; and
accepting each of the messages, respectively, only after determining that the received message includes
the generated key,
an expected identifier of the source of the message,
a correct identifier of the safety device,
an expected sequence number indicating how many of the plurality of messages preceded the message during the communication session,
a command for the safety device, and
at least one cyclic redundancy code (CRC) based on content of the message that matches a corresponding CRC determined by the safety device based on the content of the message.

12. The method of claim 11, comprising
setting a maximum duration for the communication session responsive to a received indication of the maximum duration associated with an initiation of the communication session; and
automatically terminating the communication session when the maximum duration expires.

13. The method of claim 11, comprising
accepting the received messages only if the messages are received in a specified order comprising
(i) an open communications request message,
(ii) a message indicating a requested change to at least one parameter or value of the safety device, and
(iii) a message directing the safety device to make the requested change; and
providing an indication regarding each accepted one of the messages.

14. The method of claim 11, comprising
generating the key based on a random number;
only responding to messages during the communication session that contain the key; and
generating another key responsive to terminating the communication session.

15. The method of claim 11, comprising using a Modbus protocol as a platform for the communicating.

16. The method of claim 15, wherein the at least one CRC is a Modbus CRC.

17. The method of claim 11, wherein the at least one CRC comprises a first CRC based on data within the message and a second CRC based on registers of the safety device that are affected by at least one of the message commands.

18. The method of claim 11, comprising
accepting a received one of the messages only if the message is formatted so that each of the key, the identifier of the source of the message, the identifier of the safety device, the sequence number, the command for the safety device, and the at least one CRC are associated with a respective, preselected register of the safety device.

19. A system, comprising:
at least one safety device configured to operate based on at least one value or parameter; and
supervisory equipment that is located remotely from the at least one safety device, the supervisory equipment is configured to allow a user to configure the at least one parameter or value of the safety device during a communication session in which
the safety device generates a key for use only during a single communication session with
the supervisory equipment,
the supervisory equipment determines the key and sends a plurality of messages to the safety device during the single communication session, each of the plurality of messages being acceptable by the safety device only if the message includes
the key,
an identifier of the supervisory equipment,
an identifier of the safety device,
a sequence number indicating how many of the plurality of messages preceded the message during the communication session,
a command for the safety device, and
at least one cyclic redundancy code (CRC) based on content of the message,
the safety device provides an indication of an accepted one of the messages to the supervisory equipment, and the supervisory equipment sends a next one of the plurality of messages only after confirming that the safety device has accepted a most recently sent one of the plurality of messages.

20. The system of claim 19, wherein the supervisory equipment sends the plurality of messages to the safety device in a specified order comprising
 (i) an open communications request message,
 (ii) a message indicating a requested change to at least one parameter or value of the safety device, and
 (iii) a message directing the safety device to make the requested change.

21. The system of claim 19, wherein the communication session is conducted using a Modbus protocol.

22. The system of claim 19, wherein the at least one CRC of each message comprises a first CRC based on data within the message and a second CRC based on registers of the safety device that are affected by at least one of the message commands.

23. The system of claim 19, wherein the key is based on a random number and the key in each of the plurality of messages must be the same for each message to be accepted by the safety device.

24. The system of claim 19, wherein the communication session has a maximum duration time that is set by the supervisory equipment when initiating the communication session and the communication session is automatically terminated responsive to the maximum duration time expiring.

25. The system of claim 19, wherein each of the messages is formatted so that each of the obtained key, the identifier of the source of the message, the identifier of the safety device, the sequence number, the command for the safety device, and the at least one CRC are associated with a respective, preselected register of the safety device.

* * * * *

UNITED STATES PATENT AND TRADEMARK OFFICE
CERTIFICATE OF CORRECTION

PATENT NO.          : 9,621,358 B2                                  Page 1 of 1
APPLICATION NO.     : 13/577457
DATED               : April 11, 2017
INVENTOR(S)         : James Pelletier and Muhidin A. Lelic It is certified that error appears in the above-identified patent and that said Letters Patent is hereby corrected as shown below:

In the Claims

In Claim 25, Column 20, Line 13; before "the identifier" replace "source of the message," with --supervisory equipment,--

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*